(12) United States Patent
Lee

(10) Patent No.: US 10,899,338 B2
(45) Date of Patent: Jan. 26, 2021

(54) VEHICLE AND METHOD FOR DISPLAYING DISTANCE TO EMPTY

(71) Applicants: Hyundai Motor Company, Seoul (KR); Kia Motors Corporation, Seoul (KR)

(72) Inventor: Kyujin Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 242 days.

(21) Appl. No.: 15/797,018

(22) Filed: Oct. 30, 2017

(65) Prior Publication Data

US 2018/0170354 A1 Jun. 21, 2018

(30) Foreign Application Priority Data

Dec. 16, 2016 (KR) .................. 10-2016-0172428

(51) Int. Cl.
| | |
|---|---|
| *B60W 20/15* | (2016.01) |
| *B60W 20/13* | (2016.01) |
| *G06K 9/00* | (2006.01) |
| *B60W 30/182* | (2020.01) |
| *B60K 35/00* | (2006.01) |
| *B60R 11/04* | (2006.01) |
| *B60L 58/12* | (2019.01) |

(52) U.S. Cl.
CPC ............ *B60W 20/15* (2016.01); *B60K 35/00* (2013.01); *B60L 58/12* (2019.02); *B60R 11/04* (2013.01); *B60W 20/13* (2016.01); *B60W 30/182* (2013.01); *G06K 9/00791* (2013.01); *B60K 2370/154* (2019.05); *B60K 2370/167* (2019.05); *B60K 2370/169* (2019.05); *B60W 2510/244* (2013.01); *B60W 2530/209* (2020.02)

(58) Field of Classification Search
CPC ............................ B60W 20/15; B60W 20/13
See application file for complete search history.

(56) References Cited

U.S. PATENT DOCUMENTS

| | | | |
|---|---|---|---|
| 2012/0179420 A1* | 7/2012 | Gilman | G01C 21/3697 702/165 |
| 2013/0221741 A1* | 8/2013 | Stanek | H02J 7/342 307/9.1 |
| 2014/0121956 A1* | 5/2014 | Jastrzebski | B60L 58/13 701/123 |
| 2015/0369619 A1* | 12/2015 | Kim | G01C 21/3469 701/22 |
| 2016/0061610 A1* | 3/2016 | Meyer | G01C 21/26 701/22 |

(Continued)

*Primary Examiner* — Jess Whittington
(74) *Attorney, Agent, or Firm* — Mintz Levin Cohn Ferris Glovsky and Popeo, P.C.; Peter F. Corless

(57) ABSTRACT

The present disclosure provides a vehicle and method for controlling the same, by which a driving condition of the vehicle is determined and the distance to empty (DTE) of the vehicle is estimated based on the driving condition, thereby providing the driver with more accurate and practical DTE. The vehicle includes a power source that supplies power to a vehicle and a sensor that detects a driving condition of the vehicle. A controller estimates the DTE of the vehicle based on the detected driving condition and the power, and outputs the DTE of the vehicle through an output unit.

19 Claims, 11 Drawing Sheets

(56) References Cited

U.S. PATENT DOCUMENTS

| | | | |
|---|---|---|---|
| 2016/0097652 A1* | 4/2016 | Liu .................... | G01C 21/3469 |
| | | | 701/423 |
| 2016/0129918 A1* | 5/2016 | Skaff ....................... | B60L 50/16 |
| | | | 340/455 |
| 2018/0120841 A1* | 5/2018 | Endo ....................... | G05D 1/021 |

* cited by examiner

FIG.5A
*RELATED ART*
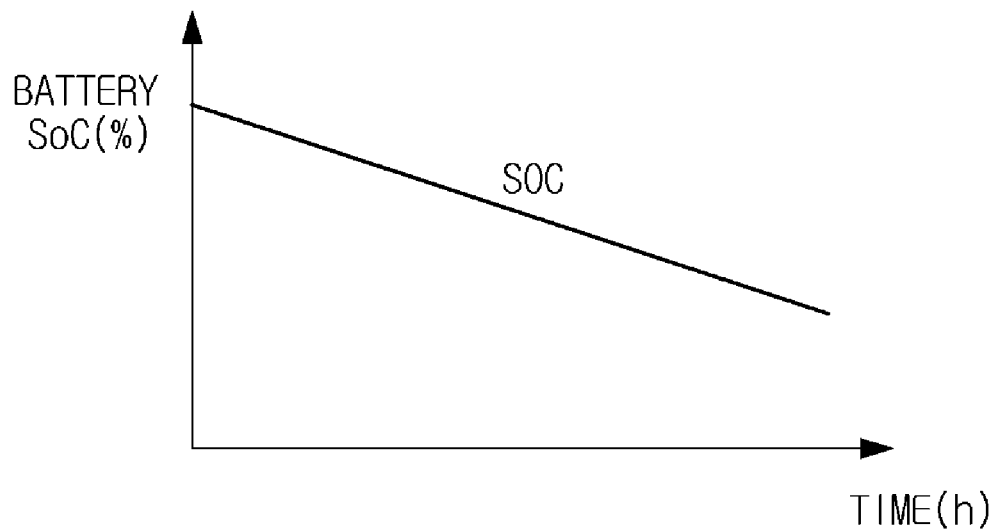
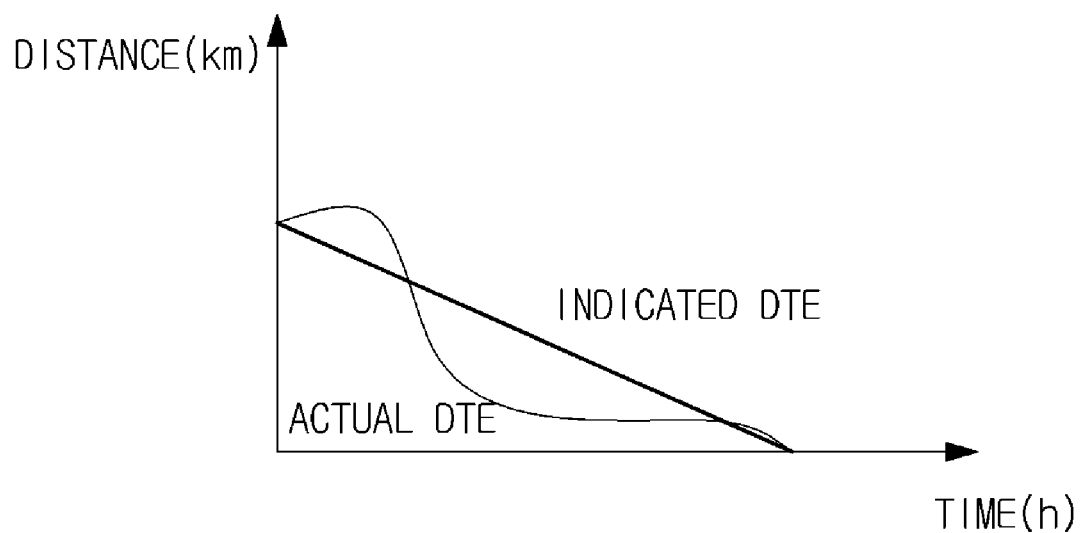

FIG.5B
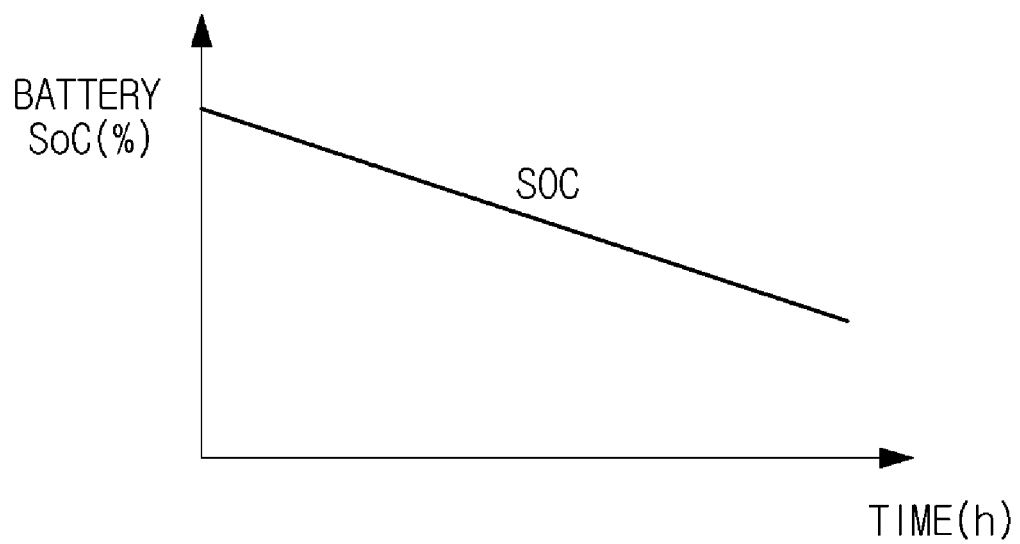
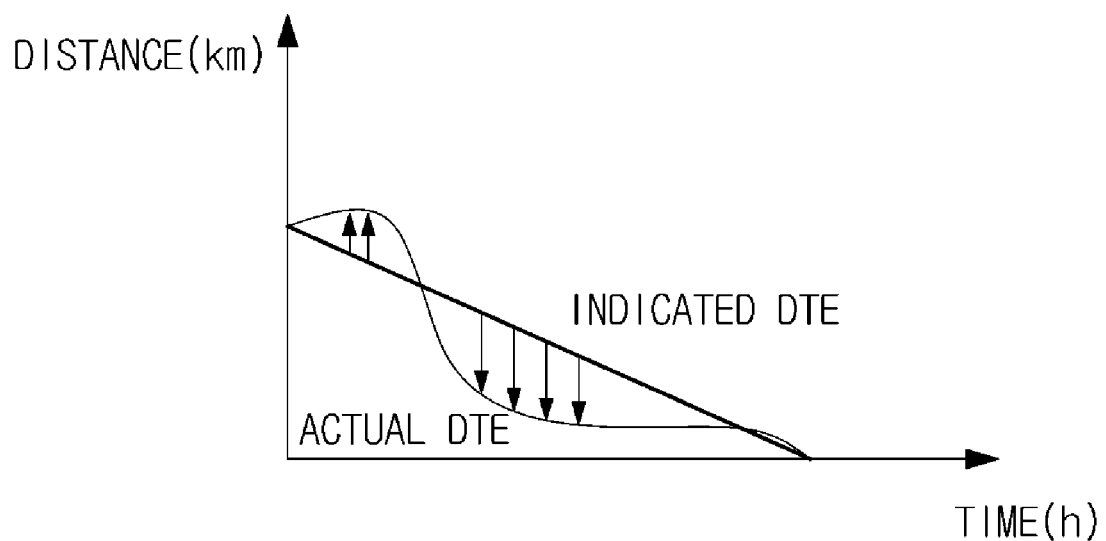

FIG. 8

| | SERIOUS TRAFFIC JAM | TRAFFIC JAM | CROWDED CITY | HIGHWAY | EXPRESSWAY | ULTRA-EXPRESSWAY | HIGH LOAD ENERGY | NORMAL LOAD ENERGY | LOW LOAD ENERGY | UPHILL | FLAT | DOWNHILL |
|---|---|---|---|---|---|---|---|---|---|---|---|---|
| DTE REFERENCE VALUE | 32 | 45 | 60 | 90 | 72 | 52 | 54 | 60 | 63 | 36 | 60 | 82 |
| EXISTING CUMULATIVE VALUE | 300 | 600 | 300 | 900 | 600 | 300 | 1200 | 1500 | 300 | 150 | 2700 | 150 |
| AMOUNT OF CHANGE | 12 | 36 | 12 | -12 | -36 | -12 | 51 | -45 | -6 | 18 | 24 | -42 |
| NEW CUMULATIVE VALUE | 312 | 636 | 312 | 888 | 564 | 288 | 1251 | 1455 | 294 | 168 | 2724 | 108 |
| EXISTING CUMULATIVE WEIGHT | 10.0% | 20.0% | 10.0% | 30.0% | 20.0% | 10.0% | 40.0% | 50.0% | 10.0% | 5.0% | 90.0% | 5.0% |
| NEW CUMULATIVE WEIGHT | 10.4% | 21.2% | 10.4% | 29.6% | 18.8% | 9.6% | 41.7% | 48.5% | 9.8% | 5.6% | 90.8% | 3.6% |
| EXISTING INDICATION | 3.2 | 9.0 | 6.0 | 27.0 | 14.4 | 5.2 | 21.6 | 30.0 | 6.3 | 1.8 | 54.0 | 4.1 |
| NEW INDICATION | 3.3 | 9.5 | 6.2 | 26.6 | 13.5 | 5.0 | 22.5 | 29.1 | 6.2 | 2.0 | 54.5 | 3.0 |
| | | | | | | | | | | | EXISTING INDICATION | 62.4 |
| | | | | | | | | | | | NEW INDICATION | 62.0 |

VEHICLE AND METHOD FOR DISPLAYING DISTANCE TO EMPTY

CROSS-REFERENCE TO RELATED APPLICATION

This application claims priority to and the benefit of Korean Patent Application No. 10-2016-0172428, filed on Dec. 16, 2016, the disclosures of which is incorporated herein by reference in its entirety.

BACKGROUND

1. Field of the Disclosure

The present disclosure relates to a vehicle and method for controlling the same, and more particularly, to a vehicle and vehicle control method that provide more accurate and practical information regarding a distance to empty.

2. Discussion of Related Art

Conventional plug-in hybrid electric vehicles measure the distance to empty (DTE) based on charging and discharging energy of the battery. Specifically, the DTE is estimated by determining overall energy of the battery, calculating remaining energy of the battery by a battery managing system (BMS), and estimating a reduced form of the remaining energy of the battery if an air conditioner is being operated.

However, there is a problem with the way of estimating the DTE simply based on the remaining battery energy since the efficiency of the battery differs by driving speed of the vehicle and the output power of the battery differs by the extent of air conditioning. Furthermore, the vehicle is driven under many different driving conditions and the DTE differs by the driving condition, and thus, the DTE estimated based on the remaining battery energy has a difference from an actual DTE. The difference between the actual DTE of the vehicle and the estimated DTE may cause confusion for the driver, and thus a need exists to estimate and indicate the actual DTE. Studies are actively underway to solve the problem since fuel efficiency is an important factor for the plug-in hybrid electric vehicle in particular.

SUMMARY

The present disclosure provides a vehicle and method for controlling the same, by which a driving condition of the vehicle is determined and the distance to empty (DTE) of the vehicle is estimated based on the driving condition, thereby providing the driver with more accurate and practical DTE.

In accordance with one aspect of the present disclosure, a vehicle is provided that may include a power source configured to supply power to a vehicle; a sensor unit configured to detect a driving condition of the vehicle; an output unit configured to indicate a distance to empty (DTE) of the vehicle; and a controller configured to estimate the DTE of the vehicle based on the driving condition of the vehicle detected by the sensor unit and the power, and output the DTE of the vehicle through the output unit.

The vehicle may further include: a storage configured to store cumulative information regarding a cumulative distance traveled by the vehicle that corresponds to each of past driving conditions of the vehicle. The controller may be configured to estimate the DTE of the vehicle based on the cumulative information, the driving condition of the vehicle, and the power, and output the DTE of the vehicle through the output unit.

Additionally, the storage may be configured to store a reference value of the DTE of the vehicle that corresponds to a predetermined driving condition of the vehicle. The controller may be configured to estimate the DTE of the vehicle based on the reference value, the cumulative information, the driving condition of the vehicle, and the power, and output the DTE of the vehicle through the output unit. The controller may further be configured to derive cumulative weights of the lative information based on respective frequencies of the past driving conditions of the vehicle, and estimate the DTE of the vehicle based on the cumulative information, the cumulative weight, the driving condition of the vehicle, and the power, and output the DTE of the vehicle through the output unit.

The driving condition of the vehicle may include driving locations of the vehicle. For example, the controller may be configured to determine the driving location of the vehicle to be one of highway, expressway, and crowded city (e.g., high congestion), derive a DTE of the vehicle based on the determination, and output the DTE of the vehicle through the output unit. The driving condition of the vehicle may also include traffic conditions. For example, the controller may be configured to determine the traffic condition to be one of serious traffic jam, traffic jam, and traffic fine based on the number of detected surrounding vehicles and speeds thereof, derive a DTE of the vehicle based on the determination, and output the DTE of the vehicle through the output unit.

Further, the driving condition of the vehicle may include energy consumption apart from driving the vehicle while the vehicle is being driven. For example, the controller may be configured to determine the energy consumption apart from driving the vehicle while the vehicle is being driven to be one of high load energy, normal load energy, and low load energy, derive a DTE of the vehicle based on the determination, and output the DTE of the vehicle through the output unit.

The driving condition of the vehicle may include information regarding geographical features around the vehicle while the vehicle is being driven. For example, the controller may be configured to determine the information regarding geographical features around the vehicle while the vehicle is being driven, to be one of uphill, flat road, and downhill, derive a DTE of the vehicle based on the determination, and output the DTE of the vehicle through the output unit. The sensor unit may be configured to detect a distance traveled by the vehicle, and the controller may be configured to estimate a driving condition of the vehicle based on the distance traveled by the vehicle detected by the sensor unit.

The vehicle may further include an image acquirer (e.g., an imaging device) configured to obtain an image around the vehicle. The controller may be configured to estimate a driving condition of the vehicle based on the image around the vehicle. The vehicle may include a communication unit configured to receive location information of the vehicle. The controller may be configured to estimate a driving condition of the vehicle based on the location information of the vehicle. The power source may include a battery configured to supply electric energy to the vehicle.

In accordance with one aspect of the present disclosure, a method for controlling a vehicle may include: supplying power to the vehicle, detecting a driving condition of the vehicle; estimating a distance to empty (DTE) of the vehicle based on the driving condition of the vehicle and the power;

and outputting the DTE of the vehicle. The method may further include: storing cumulative information regarding a cumulative distance traveled by the vehicle that corresponds to each of past driving conditions of the vehicle.

The estimating of the DTE of the vehicle may include estimating the DTE of the vehicle based on the cumulative information, the driving condition of the vehicle, and the power. The method may further include: storing a reference value of the DTE of the vehicle that corresponds to a predetermined driving condition of the vehicle. The estimating the DTE of the vehicle may include estimating the DTE of the vehicle based on the reference value, the cumulative information, the driving condition of the vehicle, and the power.

The estimating of the DTE of the vehicle may include deriving cumulative weights of the cumulative information based on respective frequencies of the past driving conditions of the vehicle. Additionally, the estimating of the DTE of the vehicle may be based on the cumulative information, the cumulative weight, the driving condition of the vehicle, and the power. The driving condition of the vehicle may include driving locations of the vehicle, and the estimating of the DTE of the vehicle may include determining the driving location of the vehicle to be one of highway, expressway, and crowded city, and deriving a DTE of the vehicle based on the determination.

The driving condition of the vehicle may include traffic conditions. For example, the estimating of the DTE of the vehicle may include determining the traffic condition to be one of serious traffic jam, traffic jam, and traffic fine, and deriving a DTE of the vehicle based on the determination. The driving condition of the vehicle may include energy consumption apart from driving the vehicle while the vehicle is running. For example, the estimating of the DTE of the vehicle may include determining the energy consumption apart from driving the vehicle while the vehicle is running to be one of high load energy, normal load energy, and low load energy, and deriving a DTE of the vehicle based on the determination. The driving condition of the vehicle may include information regarding geographical features around the vehicle while the vehicle is running. For example, the estimating of the DTE of the vehicle may include determining the information regarding geographical features around the vehicle while the vehicle is running, to be one of uphill, flat road, and downhill, and deriving a DTE of the vehicle based on the determination.

The detecting of a driving condition of the vehicle may include detecting a distance traveled by the vehicle. The estimating of a driving condition of the vehicle may include estimating a driving condition of the vehicle based on the distance traveled by the vehicle. The detecting of a driving condition of the vehicle may include obtaining an image around the vehicle. Additionally, the estimating of a driving condition of the vehicle may include estimating a driving condition of the vehicle based on the image around the vehicle. The method may further include: receiving location information of the vehicle. The estimating of a driving condition of the vehicle may include estimating a driving condition of the vehicle based on the location information of the vehicle.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIGS. 5A-5B shows graphs each representing a difference between an estimated DTE and an actual DTE;

FIG. 8 is a table for estimating an accurate DTE, according to an exemplary embodiment of the present disclosure.

DETAILED DESCRIPTION

Figure 1:
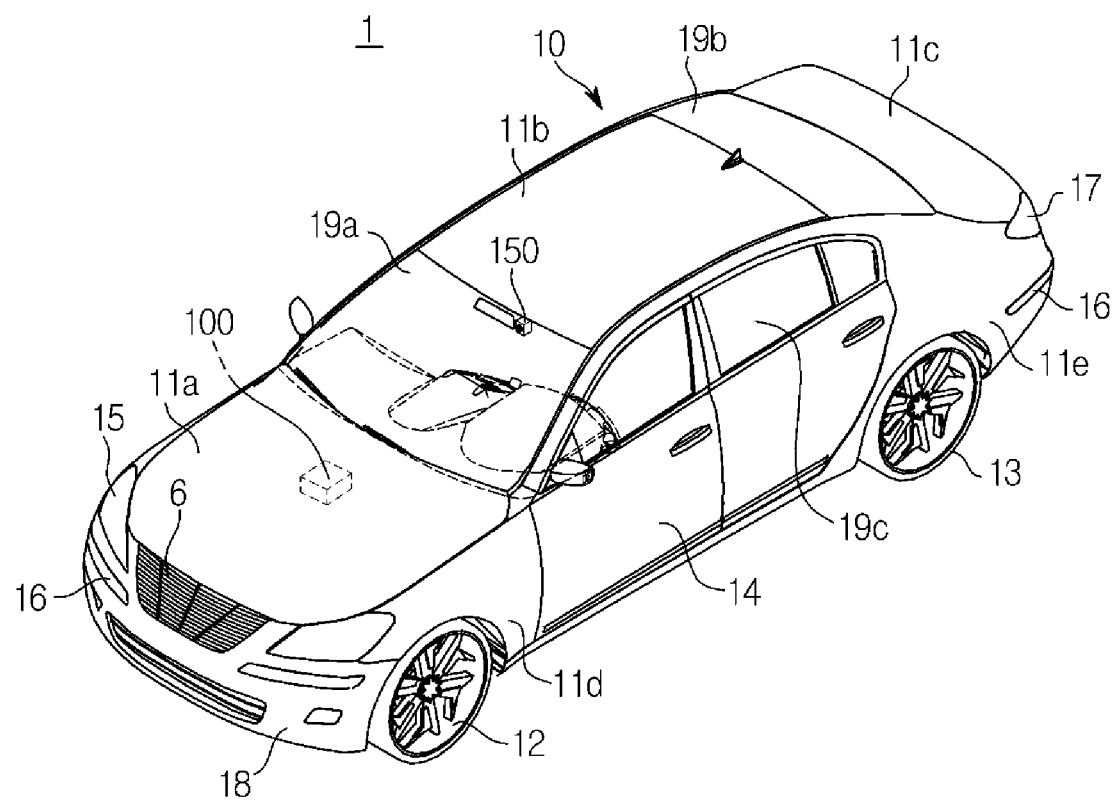
FIG. 1 is a perspective view schematically illustrating the exterior of a vehicle, according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like numerals refer to like elements throughout the specification. Not all elements of exemplary embodiments of the present disclosure will be described, and description of what are commonly known in the art or what overlap each other in the exemplary embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network. The term "include (or including)" or "comprise (or comprising)" is inclusive or open-ended and does not exclude additional, unrecited elements or method steps, unless otherwise mentioned. Throughout the specification, when it is said that a member is located "on" another member, it implies not only that the member is located adjacent to the other member but also that a third member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

Reference numerals used for method steps are just used for convenience of explanation, but not to limit an order of the steps. Thus, unless the context clearly dictates otherwise, the written order may be practiced otherwise.

The principle and embodiments of the present disclosure will now be described with reference to accompanying drawings. FIG. 1 is a perspective view schematically illustrating the exterior of a vehicle, according to an exemplary embodiment of the present disclosure.

Referring to FIG. 1, a vehicle 1 may include a vehicle frame 10 that forms the exterior of the vehicle, and wheels 12, 13 for moving the vehicle 1. The vehicle frame 10 may include a hood 11a that protects various devices required for driving the vehicle 1, a roof panel 11b that forms an indoor space of the vehicle, a trunk lid 11c of a trunk, front fenders 11d disposed on the sides of the vehicle 1, and quarter panels 11e. There may be a plurality of doors 15 disposed on the sides of the vehicle frame 10 and hinged with the vehicle frame 10.

A front window 19a is disposed between the hood 11a and the roof panel 11b for providing a view ahead of the vehicle 1 (e.g., a forward view), and a rear window 19b is disposed between the roof panel 11b and the trunk lid 11c for providing a view behind the vehicle 1 (e.g., a rear view). Side windows 19c may also be installed into the upper part of the doors 15 to provide side views. Headlamps 15 may be disposed on the front of the vehicle 1 to illuminate a direction in which the vehicle 1 is moving or traveling. Turn signal lamps 16 may also be disposed on the front and back of the vehicle 1 to provide an indication of a direction in which the vehicle 1 will turn. The turn signal lamp 16 may also output a blinking light to indicate a turning direction. Tail lamps 17 may also be disposed on the back of the vehicle 1 and may indicate a state of gear shift, a state of brake operation of the vehicle 1, etc.

At least one vehicle controller 100 may be included within the vehicle 1. The vehicle controller 100 may be configured to perform electronic control over operation of the vehicle 1. The vehicle controller 100 may be installed in any position within the vehicle 1 according to a designer or manufacturer selection. For example, the vehicle controller 100 may be installed between the engine room and the dashboard, or installed inside of the center fascia. The vehicle controller 100 may include at least one processor configured to receive electric signals, handle (e.g., respond to) the electric signals, and output results of handling the electric signals. The at least one processor may be implemented with at least one semiconductor chip and associated components. The at least one semiconductor chip and associated components are installed on a printed circuit board (PCB) that may be installed inside of the vehicle 1.

The vehicle 1 may be a plug-in hybrid electric vehicle (PHEV). The PHEV is a vehicle using both a combustion engine and electric battery power, and runs on electricity from the battery charged at home or charged by inserting the plug into an external outlet and when the electricity level is empty, runs on the gasoline engine. The PHEV has high fuel efficiency, and may run a short range of about 50 to 60 km only on the battery without activation of the combustion engine. Furthermore, the PHEV does not need a quick charging station, but may run a sufficiently long distance even through slow charging along with the combustion engine.

Figure 3:
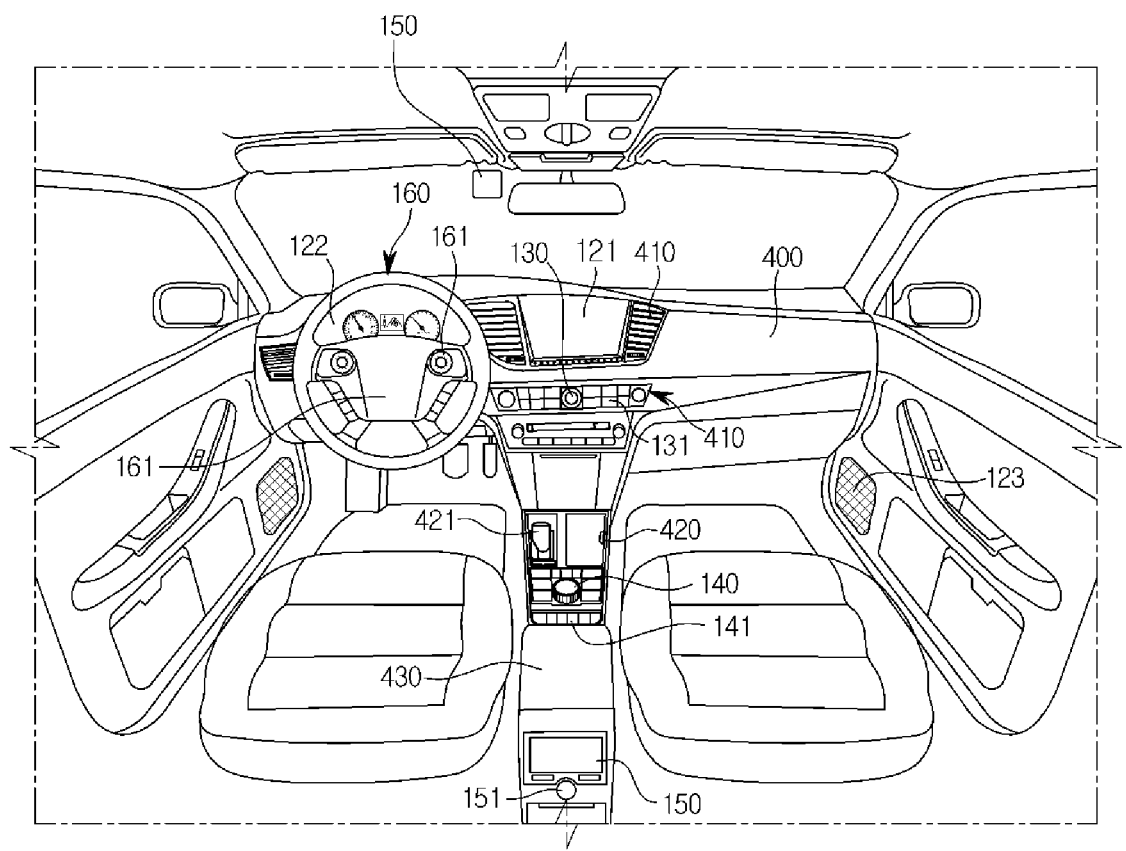
FIG. 3 shows internal features of a vehicle, according to an exemplary embodiment of the present disclosure.

FIG. 3 shows internal features of a vehicle, according to an exemplary embodiment of the present disclosure. Referring to FIG. 3, the internal features may include a dashboard 400, a center fascia 410 that extends from the dashboard 400, a gearbox 420 installed at the bottom end of the center fascia 410, and a console box 430 installed at the back end of the gear box 420 within the vehicle 1.

The dashboard 400 may separate an engine room 5 from the interior space of the vehicle 1 and may include a steering wheel 160, an instrument panel 122, a ventilation duct 401, and the like installed therein. The steering wheel 160 may be installed on the dashboard 400 in the vicinity of the driver's seat. The steering wheel 160 may include a rim 162 to be held by the driver, and a spoke 161 for connecting the rim 162 and an hub of the steering device of the vehicle located on the rotation axis for steering. The driver may manipulate the rim 162 to rotate the spoke 161 to change the moving direction of the wheels, thereby changing the traveling direction of the vehicle 1. Furthermore, various input units for operating a radio system, a vehicle communication system, the instrument panel 122, or the like may be mounted on the spoke 402.

For example, as shown in FIG. 3, an input unit, such as a scroll wheel, a button, a knob, a touch screen, a touch pad, a lever, a trackball, an operation sensor, or a voice recognition sensor may be mounted on the spoke 161.

Figure 4:
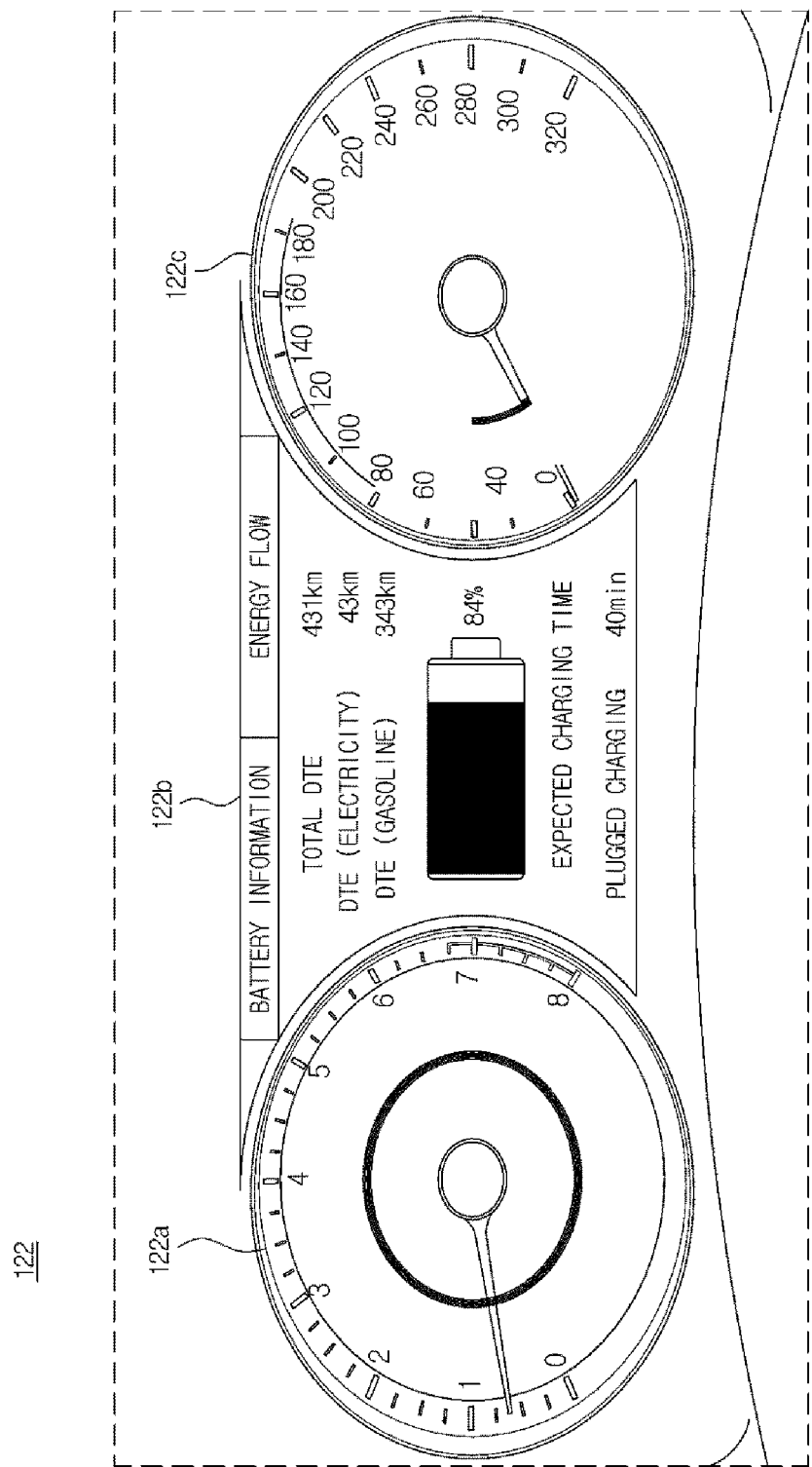
FIG. 4 shows an output unit on which the distance to empty (DTE) of a vehicle is indicated, according to an exemplary embodiment of the present disclosure.

The instrument panel 122 may indicate a driving speed of the vehicle 1, engine revolution per minute (rpm), an amount of remaining fuel, a distance to empty (DTE), etc. The instrument panel 122 may be generally installed on the dashboard 400 behind the steering wheel 100. In some exemplary embodiments, the instrument panel 122 may be installed in another position on the dashboard 400, on the center fascia 410, or any other location within the vehicle. The instrument panel 122 may include, as shown in FIG. 4 which will be described later, a speedometer, a tachometer that indicates the engine rpm, and a fuel gauge that indicates an amount of remaining fuel.

The ventilation ducts 410 may be configured to supply air at a particular or selected temperature to the inside of the vehicle 1 according to operation of an air conditioning system to adjust the temperature inside the vehicle 1. The ventilation ducts 410 may be installed at any location on the dashboard 400. For example, the ventilation ducts 410 may be installed on both sides to the display 121, as shown in FIG. 3.

The display 121 may be installed on the upper frame of the dashboard 300. In particular, the display 121 may be configured to output and provide various images, such as moving images or still images to the user. The display 121 may also be configured to display information required for driving in images. For example, the display 121 may be configured to display a map of the environment around the vehicle 1 or a traveling route of the vehicle 1. The display 121 may also be configured to display an amount of remaining energy of a battery of a power source, and the DTE of the vehicle 1 based on the amount of remaining energy of the battery. The display 121 may be, for example, a navigation device.

Further, the display 121 may include a display panel and an external housing to fix the display panel. A fixer (not shown) may be installed on the side or back of the external housing to fix the display 121 to a particular position inside the vehicle 1, e.g., onto a dashboard 400. When the display 121 is disposed on the upper part of the dashboard 400, the driver and a fellow passenger are able to conveniently view the content on the screen of the display 121.

The center fascia 410 may be disposed between the dashboard 400 and the gear box 420. The center fascia 410 may include at least one of a scroll wheel, a button, a knob, a touch screen, a touch pad, a lever, and a track ball for the driver or the passenger to input various instructions to operate many different functions of the vehicle 1. At the bottom end of the center fascia, there may be a gear box 420 equipped with a gear system. A gear lever 421 for gear shifting may protrude from the gear box 420. An input unit may be disposed in the gear box 420 for the driver to input various commands to operate various functions of the vehicle 1.

A console box 430 may be arranged at the back end of the gear box 420 and used to store various items therein. Moreover, a speaker 123 configured to output sounds may be mounted within the vehicle 1. Accordingly, the vehicle 1 may be configured to output a sound through the speaker 123 required in performing audio, video, navigation, and other additional functions. In particular, when the DTE of the vehicle 1 is less than a predetermined vale, a warning signal may be output. In addition to the internal speaker 123 for outputting sound, the vehicle 1 may have at least one or more external speakers configured to output sound to the outside to provide various sounds for pedestrians, drivers of other vehicles, etc., to recognize the vehicle 1.

Figure 2:
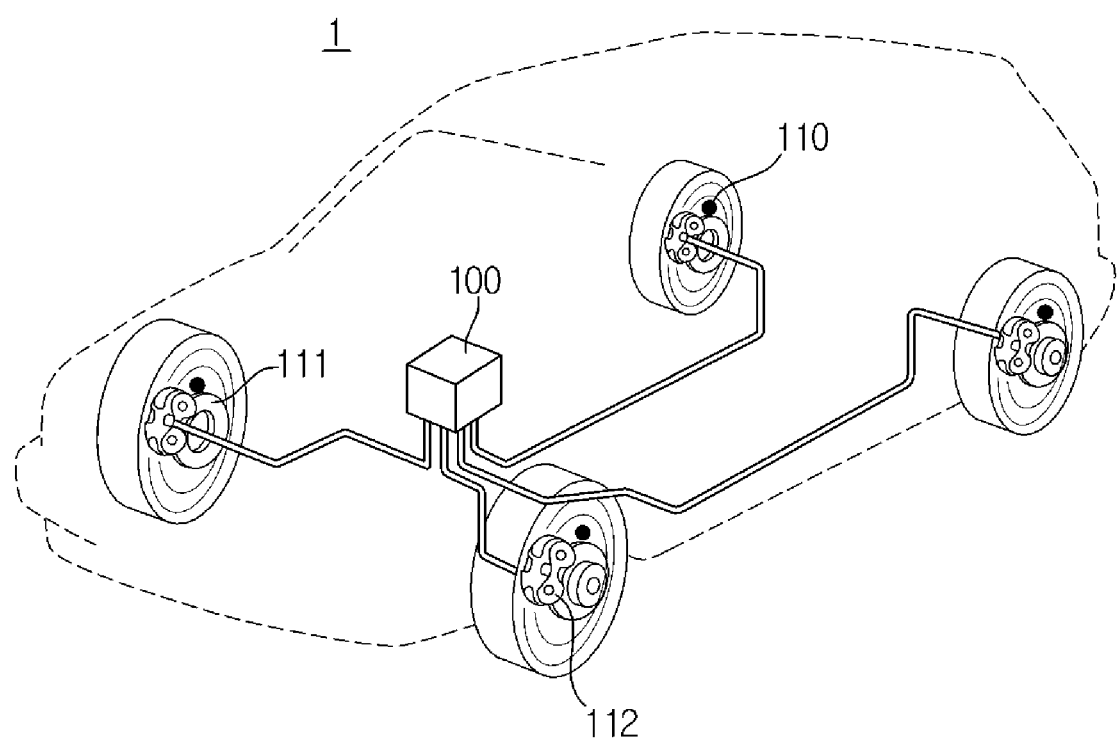
FIG. 2 shows a sensor unit of a vehicle, according to an exemplary embodiment of the present disclosure.

FIG. 2 shows a sensor unit of a vehicle, according to an exemplary embodiment of the present disclosure. Referring to FIG. 2, the vehicle may be equipped with an anti-lock braking system (ABS). The ABS may include a booster and master cylinder of e.g., a braking system, and a controller 100, a hydraulic control unit (HCU), a sensor unit 110 configured to detect the speed of wheels, a pedal travel switch (PTS) configured to detect an engagement of the brake, a disc brake 111, and a caliper 112, which are electronic control devices.

The disc brake 111 may compress pads on both sides of a disc rotating with the vehicle wheels and cause friction to obtain braking power. For a closed-type drum brake, it may make up for a defect of a frequently-used drum expanding and not working due to the frictional heat. Main parts of the ABS system may include a disc rotating with a wheel hub, pads abutting the disc to cause friction, a hydraulically operated wheel cylinder, a caliper 112 accommodating the wheel cylinder, etc.

The caliper 112 is a device for stepping on the front wheel brake by sticking the pads of the vehicle closely to the disc brake 111, and is hydraulically operated. It may have the form of enclosing the front wheel brake disc. While the brake is working, when the master cylinder receives hydraulic pressure, brake oil in the cylinder generates hydraulic pressure and thus, the force is acting in the cylinder to the left and right. In this regard, the force acting to the left causes the piston to slide and press the inside pad tightly to the disc (e.g., in an abutting manner), and the force acting to the right causes the housing to slide to the right. Accordingly, the outside pad may be pressed closely to the disc to produce frictional force along with the inside pad.

For releasing the brake, restitutive force of a seal piston causes the piston return to an original position, and disc rotation causes the inside pad to maintain a gap with the disc. At the same time, the outside pad maintains a gap with the disc as the binding post-tensioning force is released by the sliding action of the housing, thereby eliminating the remaining torque. A vehicle equipped with the ABS may include the sensor unit 110 attached to each wheel, and may be configured to analyze information detected from the sensor unit 110 and when one of the wheels is locked, the vehicle may be configured to pump up the wheel to balance the four wheels. Accordingly, the vehicle is prevented from skidding, and losing steering control, and since the wheels are not locked, the braking distance decreases.

The sensor unit 110 may include a plurality of sensors each attached to each of the four front and rear wheels to detect the wheel rotation speed from a change in lines of magnetic force in the tone wheel and the sensor and may be configured to transfer the detection results to a controller. The controller may be configured to derive a distance traveled in each driving condition based on the wheel speed obtained from the wheel sensor, as will be described below. In particular, as will be described below, the controller may be configured to derive a driving state of the vehicle based on the distance traveled in a unit of time measured by the sensor unit 110.

FIG. 4 shows an output unit on which the DTE of a vehicle is indicated or output, according to an exemplary embodiment of the present disclosure. Referring to FIG. 4, a cluster display 122*b* may be disposed on the instrument panel 122 between the speedometer 122*a* and the tachometer 122*c* of the instrument panel 122. The cluster display 122*b* may be configured to output a warning signal when the DTE of the vehicle 1 is less than a predetermined value. However, the cluster display 122b is not limited to being disposed between the speedometer 122a and the tachometer 122. For example, the cluster display 122b may be disposed above or below the speedometer 122a or tachometer 122c. That is, the cluster display 122b may be disposed at any place that may be considered by the system designer for convenience of the user or design. The cluster display 122b may have curved sides to correspond to the shapes of the speedometer 122a and the tachometer 122c, as shown in FIG. 4. The form of the cluster display 122b is not, however, limited thereto. The cluster display 122b may have the form of a square, rectangle, lozenge, trapezoid, circle, oval, or other shape, based on the choice of the system designer.

Further, the cluster display 122b may be configured to display a predetermined screen. In particular, the cluster display 122b may be configured to display various information, such as information regarding future driving of the vehicle, information regarding current driving conditions of the vehicle, and information regarding past driving of the vehicle. For example, the cluster display 122b may be configured to display information regarding currently activating various functions, such as DTE, average fuel efficiency, instantaneous fuel efficiency, driving time, average speed, maximum speed, navigation information, remaining distance to a destination, expected time to arrive at the destination, toll, cruise speed, etc., various information relating to vehicle checkup or maintenance, or various information including warning required for driving, maintenance, and repair of the vehicle 1.

Specifically, the cluster display 122b may be configured to display a total DTE, remaining energy of the power source supplying electric energy, and a DTE with the electric energy. In an exemplary embodiment, the cluster display 122b may be configured to display various information in multiple display sections. In particular, the multiple display sections may have sizes varying by manipulation of the user or predetermined settings. The display sections may also display different information. Although FIG. 4 only shows the instrument panel 122 among the output units, the output units may include a display 121 and a speaker 123.

FIGS. 5A-5B show graphs each representing a difference between an estimated DTE and an actual DTE.

Particularly, FIG. 5A represents a state of charge (SoC) of a battery and a DTE according to a conventional technology. Referring to FIG. 5A, the conventional technology outputs the DTE through the output unit based on the SoC of the battery. The SoC of the battery linearly decreases over time and accordingly, the DTE is output to linearly decrease as well. However, an actual DTE of the vehicle was different from the DTE indicated on the output unit. Since there may be many different driving conditions encountered by the traveling vehicle and the DTE of a fully charged battery is different in each driving condition, there is a difference between the DTE indicated on the output unit and the actual DTE.

FIG. 5B represents an SOC of a battery and a DTE according to an exemplary embodiment of the present disclosure. Referring to FIG. 5B, the DTE to be output is estimated in consideration of the SoC of the battery and many driving conditions of the vehicle. Specifically, in outputting the DTE, a DTE varying by each driving condition of the vehicle is added as an independent attribute, thereby estimating a new DTE to be output. As will be described later, a new DTE is estimated by assigning weights to different DTE for different driving conditions and output on the output unit, thereby enabling stable driving by avoiding confusion of the user and providing a more accurate DTE. Operation to estimate a DTE by adding the driving condition as an independent attribute will be described later in detail.

Figure 6:
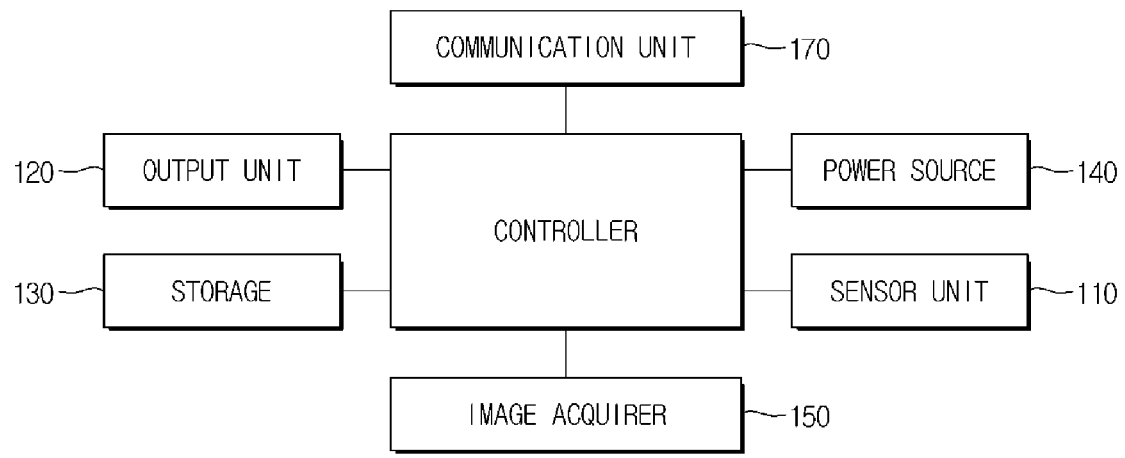
FIG. 6 is a control block diagram of a vehicle, according to an exemplary embodiment of the present disclosure.

FIG. 6 is a control block diagram of a vehicle, according to an exemplary embodiment of the present disclosure. Referring to FIG. 6, the vehicle may include a controller, a sensor unit, an output unit, a storage, and a power source. The controller may be configured to operate the other components.

In particular, the sensor unit 110 may include a wheel sensor, which may be configured to measure wheel speed. The wheels of the vehicle may be equipped in the form of tone wheels, the speed of which may be measured by the wheel sensor. In particular, the wheel sensor may be configured to detect a protuberant projection on the tone wheel while the tone wheel is rotating. Once the projection formed on the tone wheel passes the wheel sensor, a signal is induced by induced electromotive force to the wheel sensor. When the projection passes the wheel sensor, a cycle of pulse is produced. Accordingly, the wheel sensor may be configured to detect and output the number of times the projection of the tone wheel passes the wheel sensor for a predetermined period of time. The sensor unit 110 may be configured to measure a distance traveled by the vehicle in a unit of time.

The controller 100 may be configured to estimate the distance traveled by the vehicle from the data obtained by the sensor unit 110. The controller 100 may also be configured to estimate a driving condition of the vehicle from the data obtained by the sensor unit 110. For example, when the distance traveled by the vehicle in a unit of time is relatively short, the vehicle may be determined to be currently in a congested traffic area (e.g., in which the vehicle speed is about 10 km/h). In another example, deceleration and acceleration frequencies of the vehicle may be derived based on the distance traveled by the vehicle, and when the frequencies are high, the vehicle may be determined to driven in a crowded city (e.g., high congestion area). Furthermore, when the determination of the driving condition of the vehicle is made as described above, a distance traveled by the vehicle may match a corresponding driving condition, and data obtained by matching the data may be stored in the storage 130.

The controller 100 may also be configured to receive information regarding the SoC of the battery of the power source 140, as will be described below, to estimate a DTE of the vehicle. Alternatively, the DTE of the vehicle may be estimated by combining information regarding the driving condition of the vehicle and SoC of the battery. The controller 100 may include a memory configured to store a program to perform aforementioned and following operations and related data, a processor configured to execute the program stored in the memory, a hydraulic control unit (HCU), a micro controller unit (MCU), etc. The controller 100 may be incorporated in a system on chip embedded in the vehicle 1, and may operate under the control of the processor. In this regard, multiple chips may be embedded in the vehicle 1, and the aforementioned components may not be limited to being integrated in a single chip.

The storage 130 or memory may be configured to store the processed data or other data. For example, the storage 130 may be configured to store a reference value of the DTE of the vehicle. The reference value of the DTE of the vehicle is a DTE measured without being affected by other factors when the power source of the vehicle is fully charged, and may be used in estimating the following DTE. The storage 130 may be configured to store the distances traveled corresponding to the existing driving conditions, and as will be described later, the controller 100 may be configured to assign weights to distances traveled measured by the sensor unit based on the distances traveled corresponding to the driving conditions and based on this, estimate a DTE with minimal difference from an actual DTE of the vehicle.

The storage 130 may be implemented with a storage medium in a type of at least one of flash memory, hard disk, multimedia card micro type memory, card type memory (e.g., SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. It is, however, not limited thereto, but may be implemented in any other form known in the art.

The controller 100 may be configured to communicate with the sensor unit 110 and the output unit 120 via a controller area network (CAN) of the vehicle 1. The CAN network refers to a network system used for data transmission and control between electronic control units (ECUs) of the vehicle. Specifically, the CAN network transmits data through twisted pair or shield pair wires. The CAN operates according to a multi-master principle that multiple ECUs serve as masters in master/slave systems.

In an exemplary embodiment of the present disclosure, the controller 100 may be configured to receive wheel speed data in real time by the sensor unit 110 and the CAN network. In addition, the controller 100 may be configured to receive detection values sent by the sensor unit 110 via a wired network in the vehicle, such as the vehicle's 1 local interconnect network (LIN), media oriented system transport (MOST), etc., or a wireless network, such as Bluetooth. The controller 100 may be configured to transmit output signals to the output unit 120 via the communication network. The output unit 120 may be configured to receive a DTE of the vehicle 1 from the controller 100 to output the DTE of the vehicle 1.

The output unit 120 may be implemented in the form of a display, such as Liquid Crystal Displays (LCDs), Light Emitting Diodes (LEDs), Plasma Display Panels (PDPs), Organic Light Emitting Diodes (OLEDs), Cathode Ray Tubes (CRTs), or the like. The output unit 120 may be configured to visually output the DTE of the vehicle 1. The output unit 120 may include the instrument panel 122, the display 121, and the speaker 123. The output unit 120 may be configured to output the DTE received from the controller 100, and output a warning signal when the DTE of the vehicle is less than a predetermined value. There are no limitations on the type of the output information as long as the information may be recognized by the user.

The power source 140 may be configured to supply driving force for the vehicle by generating electric energy. Specifically, the power source 140 may be equipped with traction batteries for supplying major electric energy to directly supply the electric energy for operation of the vehicle, and an auxiliary battery that may be charged through the traction batteries and be able to supply electricity to various loads equipped in the vehicle. The traction batteries may be charged via charging plugs. Information regarding the SoC of the batteries equipped in the power source 140 may be transmitted to the controller 100, which may in turn estimate the DTE of the vehicle based on the information.

The vehicle may further include a communication unit 170. The communication unit 170 may be used to obtain or gather geographic information around the vehicle to estimate driving conditions of the vehicle. The communication unit 170 may include, but not exclusively, a global positioning system (GPS) configured to measure the position with satellites, and a differential global positioning system (DGPS) that supplements the GPS and configured to measure a position with high precision. The communication unit 170 may be configured to receive the current location of the vehicle and also information regarding the direction of the vehicle. The communication unit 170 may also be configured to receive map information including roads and various objects for representing the map.

Specifically, the map information may include other various objects for representing the map. The objects refer to various things other than the roads, such as buildings, signboards, mountains, rivers, etc. Besides the objects, the map information may also include various information (contents), such as speed limits on the road. For example, the communication unit 170 may be configured to receive traffic information regarding the road on which the vehicle is traveling, and transmit the associated information to the controller 100 to estimate the driving condition of the vehicle. Furthermore, the communication unit 170 may be configured to receive information regarding geographical features around the vehicle while the vehicle is being driven, and transmit the information to the controller, which may in turn estimate geographical conditions under which the vehicle is running. In addition, the map information may include information regarding a Point of Interest (POI). However, the map information is not limited to what has been described above, but may include various information that may be represented on the map.

Meanwhile, the vehicle may further include an image acquirer 150 or imaging device (e.g., camera, video camera, or the like). The image acquirer 150 may be configured to capture an image around the vehicle and transmit the image to the controller 100. The controller 100 may be configured to estimate a current driving location, geographical features, and traffic conditions around the vehicle based on the image, and accordingly estimate the DTE of the vehicle. The image acquirer 150 mounted within the vehicle 1 may include a charge-coupled device (CCD) camera or a complementary metal-oxide semiconductor (CMOS) color image sensor. The CCD and CMOS both refer to a sensor configured to convert light entering through a camera lens to an electric signal and store the electric signal. Specifically, the CCD camera is a device configured to convert an image to an electric signal using a charge-coupled device.

Furthermore, a CMOS image sensor (CIS) refers to a low consumption and low power typed image capturing device with a CMOS structure, and operates as an electronic film of a digital device. The CCD generally has good sensitivity and is commonly used for vehicles, without being limited thereto. For example, there are no limitations on the location and type of the camera, as long as the camera may provide images to the driver in the vehicle 1. At least one component may be added or deleted to correspond to the performance of the components of the vehicle shown in FIG. 6. Furthermore, it will be obvious to the ordinary skilled people in the art that the relative positions of the components may be changed to correspond to the system performance or structure.

Figure 7:
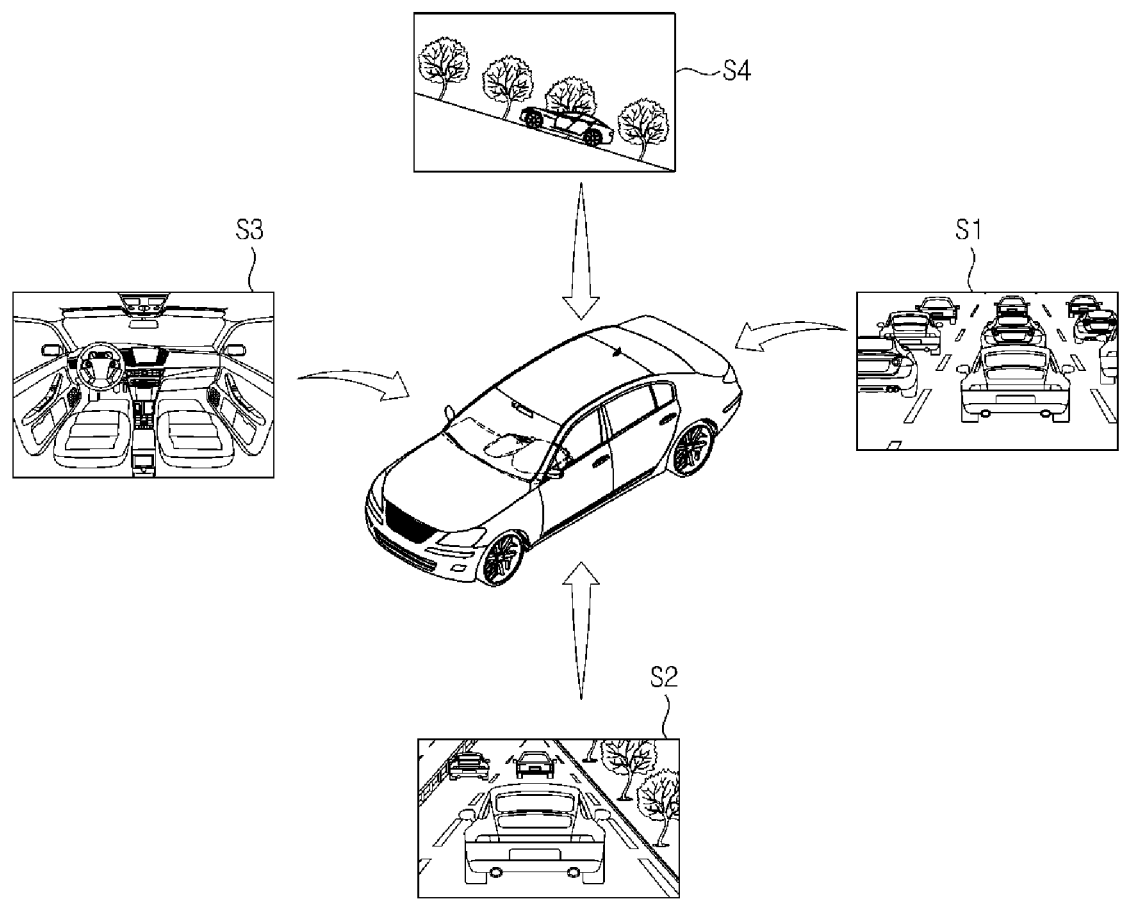
FIG. 7 shows various driving conditions of a vehicle, according to an exemplary embodiment of the present disclosure.

FIG. 7 shows various driving conditions of a vehicle, according to an exemplary embodiment of the present disclosure. Referring to FIG. 7, various driving conditions for a vehicle are represented. The driving conditions for a vehicle may be classified into traffic conditions in the city (S1), driving locations (S2), amounts of energy consumed for other purposes than driving the vehicle (S3), road inclination (S4), and the like.

The traffic condition in the city (S1) may be determined to be one of serious traffic jam, traffic jam, traffic fine. In other words, the traffic condition may include various levels of congestion based on the number of vehicles surrounding the traveling vehicle and the speeds thereof. Under the congested condition in which the road is crowded, the vehicle tends decelerate often (e.g., a stop and go scenario), and thus, the fuel efficiency may be reduced compared to when the road condition is fine (e.g., not congested). Accordingly, even when the battery is fully charged, the DTE of the vehicle may be output differently.

The driving locations (S2) may be determined to be one of highway, expressway, and crowded or congested city. Since the vehicle may travel on an expressway at high speed compared to travel on the highway or in the crowded city, such a condition may result in a higher fuel efficiency. Accordingly, even when the battery is fully charged, the vehicle may travel a longer distance on the expressway. On the contrary, when being driven in the crowded city, the vehicle may to decelerate more often (e.g., stop and go scenario) than on the expressway, and may thus travel a shorter distance even with the fully charged battery.

Energy consumed for other purposes than driving the vehicle (S3) may be determined to be high load energy, normal load energy, or low load energy. The energy may be consumed by other loads present in the vehicle other than driving the vehicle. For example, the display 121 and the speaker 123 mounted within the vehicle 1 may consume energy. In the high load energy condition where relatively high energy is used for other loads, only minimal energy is used for driving, and thus, the DTE may be shorter than in the normal or low load energy condition in which an increased amount of energy is consumed. In the low load energy condition where relatively low energy is used for the loads, a substantial amount of energy may be used in driving, and thus, the vehicle may travel a longer distance than in the high load energy condition.

Information regarding geographical features around the running vehicle (S4) may represent an inclination of a road (e.g., a slope) on which the vehicle is traveling and may be classified into uphill, flat, or downhill. The vehicle requires different energy based on the inclination of the road, and thus, the DTE may also be different according to the inclination of the road. Specifically, the DTE may be relatively shorter in the uphill road condition, but in the downhill road condition, the energy required for driving the vehicle is less than in the uphill road condition and thus the DTE may be greater than in the uphill road condition.

As described above, the controller 100 may be configured to estimate driving conditions of the vehicle 1 based on data obtained by the sensor unit 110, communication unit 170, and image acquirer 150. The driving conditions described above in connection with FIG. 7 are by way of example, and not limited thereto.

FIG. 8 is a table for estimating an accurate DTE, according to an exemplary embodiment of the present disclosure. The following operation may be derived by the controller 100 based on information obtained by the sensor unit 110, communication unit 170, and image acquirer 150 mounted within the vehicle 1 and cumulative information regarding cumulative distances traveled corresponding to the past driving conditions of the vehicle stored in the storage 130.

Referring to the table shown in FIG. 8, reference values of the DTE of the vehicle are shown in the first row. The reference values of the DTE are values of the DTE of the vehicle measured without being affected by other factors based on when the battery is fully charged. The DTE has different values for the respective driving conditions, as described above.

The second row of the table in FIG. 8 represents cumulative distances traveled by the vehicle. In an exemplary embodiment of the present disclosure, it may be assumed that the vehicle has a total cumulative mileage of 3,000 km, and had been driven 10% in significant traffic jam, 20% in traffic jam, 10% in the crowded city, 30% on the highway, 20% on the expressway, 10% on the ultra-expressway, 40% with high load energy, 10% low load energy, 5% uphill, and 5% downhill, as represented in the table of FIG. 8. Furthermore, the exemplary embodiment of FIG. 8 is based on information measured 50 times by the sensor unit 110. The controller 100 may then be configured to derive data regarding the conditions of the 50 times and the storage 130 may be configured to store the data. Accordingly, when the information is measured more than 50 times, the controller 100 may be configured to remove first measurement data and store newly derived data to maintain data corresponding to a new condition.

Specifically, since the existing cumulative mileage is 3,000 km, the mileages for the respective driving conditions, significant traffic jam 10%, traffic jam 20%, in the crowded city 10%, on the highway 30%, on the expressway 20%, on the ultra-expressway 10%, with high load energy 40%, with low load energy 10%, uphill 5%, and downhill 5% are 300 km, 600 km, 300 km, 900 km, 600 km, 300 km, 1,200 km, 300 km, 150 km, and 150 km, respectively. In an exemplary embodiment of the present disclosure, the 51st measurement data corresponds to significant traffic jam 20%, traffic jam 60%, crowded city 20%, high load energy 85%, normal load energy 15%, uphill 30%, and flat 70% while the vehicle is driven 60 km. As the 51st measurement data is added, the first measurement data may be removed as described above.

Accordingly, the third row of the table in FIG. 8 may correspond to amounts of change between the first measurement data to the 51st measurement data. For the significant traffic jam, a distance 12 km corresponding to 20% of the measurement 60 km is added; for traffic jam, a distance 36 km corresponding to 60% of the measurement 60 km is added; for crowded city, a distance 12 km corresponding to 20% of the measurement 60 km is added; for highway, a distance 12 km corresponding to 20% of the measurement of the existing first data, 60 Km, is subtracted; for expressway, a distance 36 km corresponding to 60% of the measurement of the existing first data, 60 Km, is subtracted; for ultra-expressway, a distance 12 km corresponding to 20% of the measurement of the existing first data, 60 km, is subtracted; for high load energy, a distance 51 km corresponding to 85% of the measurement 60 km is added; for normal load energy, although 15% of the 51st data is added, 90% of the existing first data is subtracted, and as a result, a distance 45 km corresponding to 75% of the overall measurement 60 km is subtracted; for low load energy, a distance 6 km corresponding to 10% of the measurement 60 km is subtracted; for flat road, although 70% of the 51st data is added, 30% of the existing first data is subtracted, and as a result, a distance 24 km corresponding to 40% of the measurement 60 km is added; and for downhill road, although 5% of the 51st data is added, 70% of the existing first data is subtracted, and as a result, a distance 42 km corresponding to 65% of the measurement 60 km is subtracted.

Accordingly, in the fourth row, the amount of change in the third row and the existing cumulative value combined is shown, and based on the newly cumulative values written in the fourth row, weights for the respective driving conditions may be calculated in the sixth row. In the exemplary embodiment of the present disclosure, the sum of ratios of the significant traffic jam, traffic jam, crowded city, highway, expressway, and ultra-expressway is set to 100%; the sum of ratios of the high load energy, normal load energy, and the low load energy is set to 100%; the sum of ratios of the uphill, flat, downhill is set to 100%.

When a new cumulative weight is derived, the DTE may be estimated again based on the product of the reference DTE and the weight. For example, before the 51st data is measured, the existing cumulative weight written in the fifth row is multiplied by the reference value of the DTE written in the first row, and the results of multiplication are all combined to estimate the existing DTE. In an exemplary embodiment, the existing DTE with the fully charged battery is 62.4 km. After the 51st data is measured, new cumulative weights are derived as represented in the sixth row, and the new cumulative weight is multiplied by the reference value of the DTE written in the first row to estimate a DTE. The estimated DTE inclusive of the 51st measurement data is 62 km. Accordingly, the controller may be configured to estimate a DTE approximate to an actual DTE of the vehicle based on the 51st measurement data and operate the output unit 120 to output the estimated DTE to provide more accurate DTE information for the driver.

Figure 9:
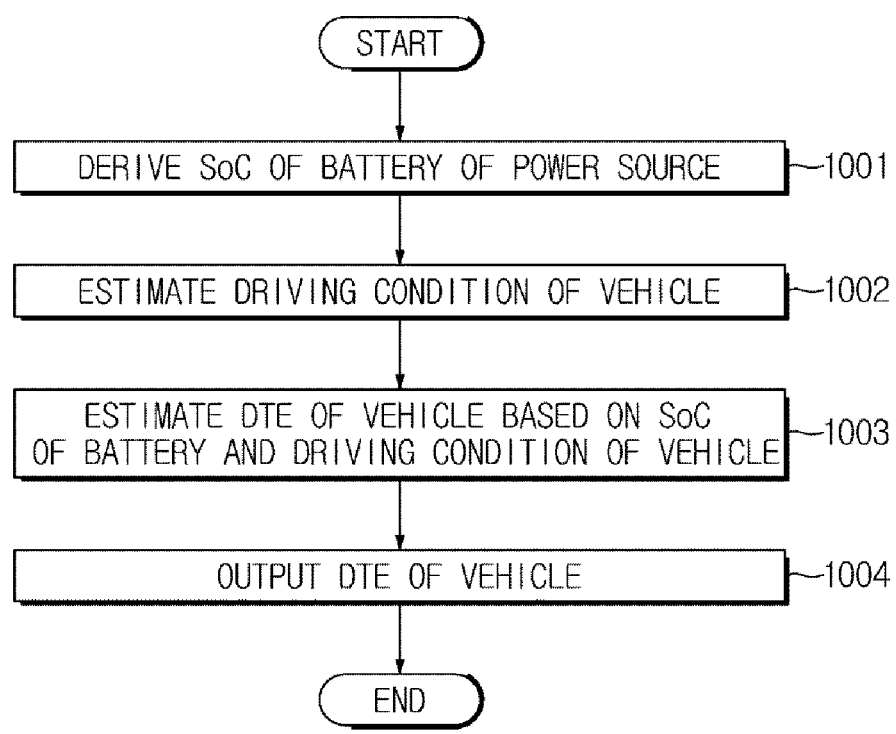
FIGS. 9 and 10 are flowcharts regarding the method for controlling the vehicle, according to an exemplary embodiment of the present disclosure.
Figure 10:
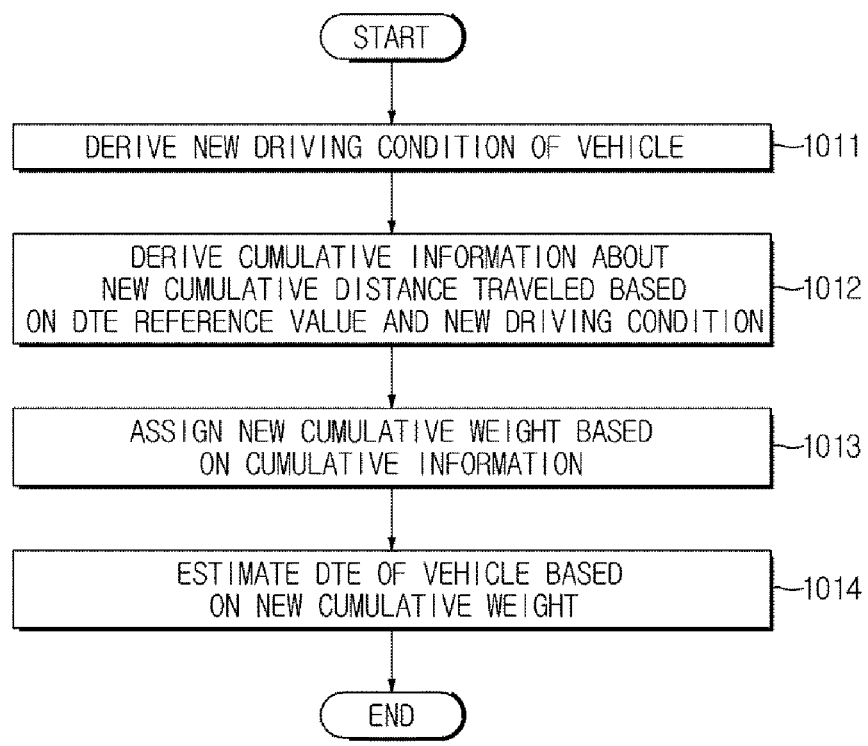

FIGS. 9 and 10 are flowcharts of the method for operating the vehicle, according to an exemplary embodiment of the present disclosure. Referring to FIG. 9, the controller may be configured to estimate an SoC of the battery of the power source, in 1001. The SoC of the battery may be used to estimate the DTE of the vehicle. The controller may be configured to estimate a driving condition of the vehicle based on information measured by the sensor unit, in 1002. Details of the driving condition were described above, so the description will be omitted. The controller may be configured to estimate a DTE of the vehicle by combining the SoC of the battery of the power source and the driving condition information of the vehicle, in 1003. The controller may then be configured to output the estimated DTE to the output unit, in 1004. Accordingly, the vehicle may then be operated by the controller based on the estimated DTE. This operation provides a more accurate drivability to a user since a more accurate DTE is provided.

FIG. 10 is a flowchart illustrating the operation of estimating the driving condition of the vehicle in more detail. Referring to FIG. 10, the controller may be configured to estimate a driving condition of the vehicle based on information measured by the sensor unit, in 1011. The driving condition of the vehicle estimated by the controller may be combined with a reference value of a predetermined DTE, to derive cumulative information regarding a new cumulative distance traveled, in 1012. The cumulative information assigns cumulative weights to the respective driving conditions of the vehicle, in 1013. With the cumulative weight assigned, a DTE of the vehicle may be estimated in 1014, thereby enabling a DTE approximate to an actual DTE to be estimated.

According to exemplary embodiments of the present disclosure, a driving condition of the vehicle may be determined and the distance to empty (DTE) of the vehicle may be estimated based on the driving condition, thereby providing the driver with more accurate and practical DTE.

The exemplary embodiments of the present disclosure have thus far been described with reference to accompanying drawings. It will be obvious to people of ordinary skill in the art that the present disclosure may be practiced in other forms than the embodiments as described above without changing the technical idea or essential features of the present disclosure. The above exemplary embodiments are only by way of example, and should not be interpreted in a limited sense.

DESCRIPTION OF THE SYMBOLS

1: VEHICLE
100: CONTROLLER
110: SENSOR UNIT
120: OUTPUT UNIT
130: STORAGE
140: POWER SOURCE

What is claimed is:
1. A vehicle, comprising:
a power source configured to supply power to a vehicle;
a sensor configured to detect a driving condition of the vehicle;
a display configured to output a distance to empty (DTE) of the vehicle;
a memory configured to store cumulative information regarding a cumulative distance traveled by the vehicle corresponding to each of past driving conditions of the vehicle; and
a controller configured to derive cumulative weights of the cumulative information based on respective frequencies of the past driving conditions of the vehicle, to estimate the DTE of the vehicle based on the cumulative information, the cumulative weight, the driving condition of the vehicle detected by the sensor and the power, and output the DTE of the vehicle through the display,
wherein the driving condition of the vehicle includes a magnitude of an electrical load generated while the vehicle is traveling, and the electrical load excludes an electrical load for driving wheels of the vehicle.
2. The vehicle of claim 1, wherein the memory is configured to store a reference value of the DTE of the vehicle that corresponds to a predetermined driving condition of the vehicle, and wherein the controller is configured to estimate the DTE of the vehicle based on the reference value, the cumulative information, the driving condition of the vehicle, and the power, and output the DTE of the vehicle through the display.
3. The vehicle of claim 1, wherein the driving condition of the vehicle includes driving locations of the vehicle, and wherein the controller is configured to:
determine the driving location of the vehicle to be one of general road, expressway, and downtown classified based on driving speed;
derive a DTE of the vehicle based on the determination; and
output the DTE of the vehicle through the display.
4. The vehicle of claim 1, wherein the driving condition of the vehicle includes traffic conditions, and wherein the controller is configured to:
determine the traffic condition depending on degree of traffic jam;
derive a DTE of the vehicle based on the determination; and
output the DTE of the vehicle through the display.

5. The vehicle of claim 1, wherein the controller is configured to:
   determine the magnitude of the electrical load to be one of large electric load, normal electric load, and small electric load;
   derive a DTE of the vehicle based on the determination; and
   output the DTE of the vehicle through the display.

6. The vehicle of claim 1, wherein the driving condition of the vehicle includes information regarding geographical features around the vehicle while the vehicle is being driven, and wherein the controller is configured to:
   determine the information regarding geographical features around the vehicle while the vehicle is being driven, to be one of uphill, flat road, and downhill;
   derive a DTE of the vehicle based on the determination; and
   output the DTE of the vehicle through the display.

7. The vehicle of claim 1, wherein the sensor is configured to detect a distance traveled by the vehicle, and the controller is configured to estimate the driving condition of the vehicle based on the distance traveled by the vehicle detected by the sensor.

8. The vehicle of claim 1, further comprising:
   an image acquirer configured to obtain an image around the vehicle,
   wherein the controller is configured to estimate the driving condition of the vehicle based on the image around the vehicle obtained by the image acquirer.

9. The vehicle of claim 1, further comprising:
   a communication unit configured to receive location information of the vehicle,
   wherein the controller is configured to estimate a driving condition of the vehicle based on the location information of the vehicle.

10. The vehicle of claim 1, wherein the power source includes a battery configured to supply electric energy to the vehicle.

11. A method for controlling a vehicle, comprising:
    supplying, by a power source, power to the vehicle,
    detecting, by a sensor, a driving condition of the vehicle;
    storing, by a controller, cumulative information regarding a cumulative distance traveled by the vehicle corresponding to each of past driving conditions of the vehicle;
    deriving, by the controller, cumulative weights of the cumulative information based on respective frequencies of the past driving conditions of the vehicle;
    estimating, by a controller, a distance to empty (DTE) of the vehicle based on the cumulative information, the cumulative weight, the driving condition of the vehicle and the power; and
    outputting, by the controller, the DTE of the vehicle,
    wherein the driving condition of the vehicle includes a magnitude of an electrical load generated while the vehicle is traveling, and the electrical load excludes an electrical load for driving wheels of the vehicle.

12. The method of claim 11, further comprising:
    storing, by the controller, a reference value of the DTE of the vehicle corresponding to a predetermined driving condition of the vehicle; and
    estimating, by the controller, the DTE of the vehicle based on the reference value, the cumulative information, the driving condition of the vehicle, and the power.

13. The method of claim 11, wherein the driving condition of the vehicle includes driving locations of the vehicle, and wherein the estimating of the DTE of the vehicle includes:
    determining, by the controller, the driving location of the vehicle to be one of general road, expressway, and downtown classified based on driving speed; and
    deriving, by the controller, a DTE of the vehicle based on the determination.

14. The method of claim 11, wherein the driving condition of the vehicle includes traffic conditions, and wherein the estimating of the DTE of the vehicle includes:
    determining, by the controller, the traffic condition depending on degree of traffic jam; and
    deriving, by the controller, a DTE of the vehicle based on the determination.

15. The method of claim 11, wherein the estimating of the DTE of the vehicle includes:
    determining, by the controller, the magnitude of the electrical load to be one of large electric load, normal electric load, and small electric load; and
    deriving, by the controller, a DTE of the vehicle based on the determination.

16. The method of claim 11, wherein the driving condition of the vehicle includes information regarding geographical features around the vehicle while the vehicle is being driven, and wherein the estimating of the DTE of the vehicle includes:
    determining, by the controller, the information about geographical features regarding the vehicle while the vehicle is being driven, to be one of uphill, flat road, and downhill; and
    deriving, by the controller, a DTE of the vehicle based on the determination.

17. The method of claim 11, wherein the detecting of a driving condition of the vehicle includes:
    detecting, by the controller, a distance traveled by the vehicle; and
    estimating, by the controller, the driving condition of the vehicle based on the distance traveled by the vehicle.

18. The method of claim 11, wherein the detecting of a driving condition of the vehicle includes:
    obtaining, by an image acquirer, an image around the vehicle; and
    estimating, by the controller, the driving condition of the vehicle based on the image around the vehicle.

19. The method of claim 11, further comprising:
    receiving, by the controller, location information of the vehicle; and
    estimating, by the controller, a driving condition of the vehicle based on the location information of the vehicle.

* * * * *